Sept. 11, 1934. H. G. ARCHER ET AL Re. 19,309

STEAM PLATEN AND METHOD OF MAKING SAME

Original Filed Oct. 12, 1929

INVENTORS:
H.G.Archer and C.G.Bird,
by Murray B. Boyce
Atty.

Reissued Sept. 11, 1934

Re. 19,309

UNITED STATES PATENT OFFICE 19,309

STEAM PLATEN AND METHOD OF MAKING SAME

Horace G. Archer, Audubon, N. J., and Clarence G. Bird, Philadelphia, Pa., assignors, by mesne assignments, to Baldwin-Southwark Corporation, a corporation of Delaware Original No. 1,928,443, dated September 26, 1933, Serial No. 399,127, October 12, 1929. Application for reissue February 10, 1934, Serial No. 710,746

6 Claims. (Cl. 29—148)

Our invention relates to steam plates or platens of the type set forth in the patent of R. W. Dinzl, No. 1,549,464, dated August 11, 1925. Platens of this type are formed from thin metal plates, usually and more frequently of rolled or forged steel, of relatively uniform thickness throughout their extent, by drilling cross passages through the body of the same parallel with the broad surfaces thereof; pairs of such passages being subsequently connected alternately adjacent opposite marginal edges of the plate in order that a continuous passage or conduit for the circulation of a heating or cooling fluid, that is to say, a temperature controlling fluid, may be provided. Suitable connections may be made at desired points, usually (though not necessarily) at opposite ends of the platen, for the inlet and discharge of such temperature controlling medium. In order that such continuous passage may be properly developed, it is necessary of course to close the ends of the cross passages which open through the edges of the platen and various means, including screw plugs and plugs welded in place, have been employed for accomplishing this result.

The present improvement relates to a method of and means for closing the bores of the plate or platen in order that the continuous conduit may be developed. Our invention comprises axially recessing the open ends of the bores of the plate or platen; the placement or positioning in said axial recesses of relatively thick plug members; such members closely fitting the recesses provided at such ends and overlying the open ends of said bores, and the securing of such closure members in final position by direct rectilinear pressure applied by a suitable tool to the metal surrounding the recess so that such metal may be upset or displaced and caused to flow into contact with such plug inserts.

These and other features of our invention are more fully set forth hereinafter; reference being had to the accompanying drawing, in which.

Figure 1:
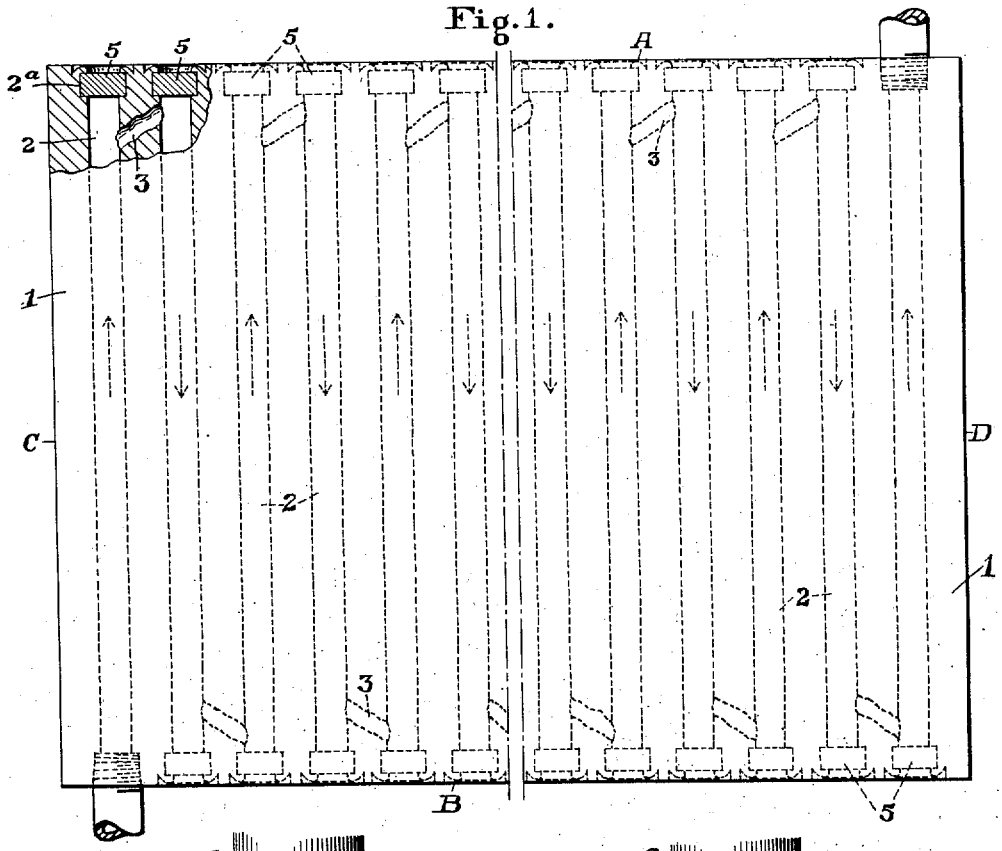
Figure 1 is a plan view of a steam platen of usual type, having its cross passages closed by plugs set in place in accordance with our invention.
Figure 2:
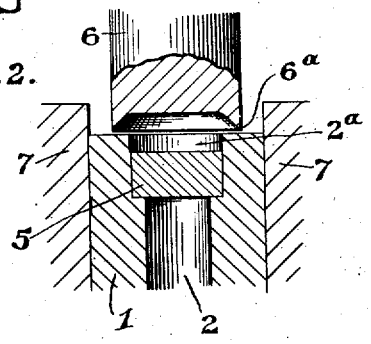
Fig. 2 is an enlarged sectional view illustrating a closure plug in position in the recessed end of a cross passage before the same has been secured in place.

In the drawing, 1 represents the body of the metal plate or platen, which may be of rolled or forged steel and of uniform thickness throughout its entire extent. While these plates may be of any shape they are usually rectangular in contour and in the present instance (for illustrative purposes only) the plate shown is rectangular in shape with a greater length than width.

The shape of the plate, however, is of no moment inasmuch as our invention may be applied to plates of any shape capable of being supported in a proper manner while the pressure of the tool is being applied to the edge of the same for the purpose of upsetting portions of such edge to retain the closure members in position. For purposes of description, the marginal edges indicated at A and B may represent the length of the plate, and those represented at C and D may represent the width of the plate.

The plate 1 is shown as drilled or bored from side to side crosswise thereof or between the marginal edges A and B and preferably parallel to the edges C and D, to form the passages 2; pairs of such passages being alternately connected together by short passages 3 which may be adjacent the marginal sides or edges A and B. The connecting passages 3 may be formed in the manner indicated in the Dinzl patent referred to, or in the manner illustrated in the patent of H. J. Ruch, No. 1,594,121, dated July 27, 1926.

For the purpose of closing the ends of the several cross bores or passages that pass through the marginal edges of the plate or platen, we propose the use of small plates or plugs, usually disk-like members, which are placed in recesses at the open ends of the cross passages 2. As illustrated in the drawing, the opposite marginal edges of the platen are axially recessed at 2*a*, surrounding the open ends of the passages 2; such recesses being preferably annular and receiving plugs or plates 5 which closely fit the same and preferably lie a short distance inwardly of the marginal edges of the platen 1.

Figure 3:
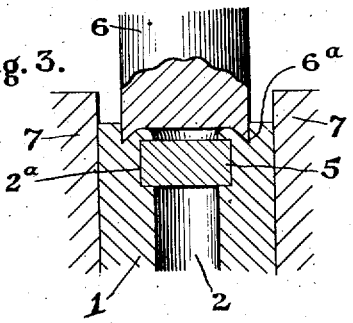
Fig. 3 is a similar view showing the plate and closure at the end of a pressing operation effected by a tool which has upset the metal and caused the same to flow over the body of the inserted plug.

For the purpose of retaining these plugs or plates 5 in position and closing the ends of the cross passages of the platen, we propose to upset the metal of the platen immediately surrounding the recessed ends of the cross passages into contact with the inserted plugs and for this purpose we provide a tool such as indicated at 6, having a recessed operative end with a relatively sharp edge indicated at 6*a*. In effecting this upsetting operation the platen may be placed on edge and in such relation to a piston or other movable member supporting such tool that, after centering the same with respect to the recess, the tool may be brought rectilinearly into contact with the metal surrounding the recess at the edge of the plate or platen and pressure being applied, such tool will be pressed into such metal and produce an upsetting of the marginal edge of the recess, as clearly illustrated in Fig. 3. This upsetting is by direct rectilinear pressure only and effects the proper disposition of the metal surrounding the recess receiving the closure plug so as to retain the same in place. This upsetting operation may be effected vertically or in any other position that conditions may suggest or require.

During this operation the plate may be held laterally or otherwise so as to prevent any deformation of the metal at the edges of the platen that might affect the surface of the same. For this purpose the plate may be gripped between side walls 7, held in proper position with respect to the plate by suitable means. If the upsetting of the edges of the platen causes any deformation or swelling of the surface of the same, they may be trued after all of the closure plugs have been set in place.

We claim:

1. A hot plate or platen for presses comprising a thin steel plate having a plurality of cross passages drilled through the same parallel with the broad surfaces of the plate and terminating at the edges of the same; each of said passages having an enlarged circular recess with parallel walls at its open ends and each recess terminating in an annular shoulder inwardly of the edge of the plate, cylindrical straight-walled plugs fitting said recesses and closing the ends of said cross passages; said plugs having a thickness less than the depth of said recesses and lying wholly inwardly of the edges of the plate and against said shoulders, and retaining means for said plugs comprising integral rings of metal upset from the body of the plate immediately surrounding said circular recesses and turned over the marginal edges of the plugs received therein; said retaining metal lying wholly within said recesses.

2. The method of closing the cross passages of steam platens, which consists in providing the ends of said cross passages opening through the marginal edges of the platens with enlarged circular recesses having parallel walls; each of said recesses terminating in an annular shoulder inwardly of the edge of the platen, applying cylindrical straight-walled closure plugs to the open ends of said recesses; said plugs having a thickness less than the depth of said recesses and being wholly disposed inwardly of the edges of the platen and against said annular shoulders, and displacing the metal of the platen over the marginal edges of said closure plugs by rectilinear pressure directly applied to the circular edge of metal immediately surrounding the recesses receiving said plugs.

3. The method of forming a steam platen which comprises forming a plurality of connecting cross passages extending from edge to edge of a thin metallic plate parallel to the broad surfaces thereof, forming circular recesses at the end of each cross passage of larger diameter than said passages; each of said recesses having an axis coincident with that of said passages and an inner annular shoulder in a plane parallel to the edges of the platen, applying circular straight-walled closure plugs to said recesses; said plugs fitting the recesses in engagement with said annular shoulders and having a uniform thickness less than the depth of said recesses, and displacing a portion of the metal of the platen about the edge of each recess over the outer marginal portion of each closure plug by rectilinear pressure applied in such manner that said plugs are held tightly against the shoulder of the recesses whereby fluid-tight closures are formed at the end of each of said cross passages.

4. The method of closing the cross passages of steam platens which comprises forming circular recesses at the end of each cross passage of larger diameter than said passages; each of said recesses having an axis coincident with that of said passages and an inner annular shoulder in a plane parallel to the edges of the platen, applying circular straight-walled closure plugs to said recesses; said plugs fitting the recesses in engagement with said annular shoulders and having a uniform thickness less than the depth of said recesses, and forming a fluid-tight closure at the ends of each passage by displacing a portion of the metal of the platen about the edge of each recess over the outer marginal portion of each closure plug by rectilinear pressure applied in line with the longitudinal axis of the passage closed by the same and in such manner that said closure plugs are held tightly against the shoulders of the recesses.

5. A hot plate or platen for presses comprising a thin steel plate having a plurality of cross passages extending through the same parallel with the broad surfaces of the plate and terminating at the edges of the same; each of said passages having an enlarged circular recess at its open ends, circular plugs fitting said recesses and closing the ends of said passages; said plugs having a thickness at their periphery less than the depth of said recesses and the peripheral portion of said plugs lying wholly inwardly of the edges of the plate, and integral rings of metal upset from the body of the plate immediately surrounding said circular recesses and turned over the marginal edges of the plugs so as to tightly engage the same.

6. The method of closing the cross passages of steam platens, which consists in providing the ends of said cross passages opening through the marginal edges of the platens with enlarged circular recesses; each of said recesses having provision for resisting inward movement of closure plugs, applying circular plain-walled closure plugs to the open ends of said recesses; said plugs having a thickness less than the depth of said recesses and being wholly disposed inwardly of the edges of the platen, and displacing the metal of the platen over the marginal edges of said closure plugs by pressure directly applied to the circular edge of metal immediately surrounding the recesses receiving said plugs.

HORACE G. ARCHER.
CLARENCE G. BIRD.